(12) United States Patent
Pero et al.

(10) Patent No.: US 8,910,780 B2
(45) Date of Patent: Dec. 16, 2014

(54) CONVEYOR BELT

(71) Applicant: Veyance Technologies, Inc., Fairlawn, OH (US)

(72) Inventors: Gregory D. Pero, Norton, OH (US); Robert H. Vogliano, Tallmadge, OH (US); Barry M. Wilson, Spring Hope, NC (US); David J. Maguire, Hudson, OH (US)

(73) Assignee: Veyance Technologies, Inc., Fairlawn, OH (US)

( * ) Notice: Subject to any disclaimer, the term of this patent is extended or adjusted under 35 U.S.C. 154(b) by 0 days.

(21) Appl. No.: 14/045,331

(22) Filed: Oct. 3, 2013

(65) Prior Publication Data

US 2014/0021021 A1 Jan. 23, 2014

Related U.S. Application Data

(60) Provisional application No. 61/769,832, filed on Feb. 27, 2013.

(51) Int. Cl.
| | |
|---|---|
| *B65G 15/34* | (2006.01) |
| *B29D 29/06* | (2006.01) |
| *D03D 1/00* | (2006.01) |
| *D03D 15/00* | (2006.01) |
| *B32B 37/10* | (2006.01) |
| *B32B 38/08* | (2006.01) |

(52) U.S. Cl.
CPC ............ *B65G 15/34* (2013.01); *B29D 29/06* (2013.01); *D03D 1/0094* (2013.01); *D03D 15/00* (2013.01); *B32B 37/1027* (2013.01); *B32B 38/08* (2013.01); *B32B 2305/08* (2013.01); *B32B 2305/18* (2013.01); *B32B 2433/02* (2013.01); *D10B 2331/04* (2013.01)
USPC ........................................................ 198/847

(58) Field of Classification Search
CPC ........................................................ B65G 15/34
USPC ................................................. 198/846, 847
See application file for complete search history.

(56) References Cited

U.S. PATENT DOCUMENTS 4,216,856 A * 8/1980 Moring et al. ................. 198/847
4,526,637 A * 7/1985 Long ............................. 156/137

(Continued)

FOREIGN PATENT DOCUMENTS

| DE | 10 2010 029355 A1 | 12/2011 |
|---|---|---|
| EP | 0484735 A1 | 5/1992 |
| EP | 0522313 A1 | 1/1993 |

*Primary Examiner* — Leslie A Nicholson, III
*Assistant Examiner* — Keith R Campbell
(74) *Attorney, Agent, or Firm* — Alvin T. Rockhill; Kathleen K. Bowen

(57) ABSTRACT

The present invention reveals a method of manufacturing a fabric reinforcement having improved peel adhesion characteristics which is of particular value in reinforcing endless belts, wherein at least two layers of fabric material are embedded in the fabric reinforcement, said process comprising (1) impregnating a fabric material with a bonding agent in a plastisol to form coated fabric material, (2) applying a plastisol layer between two or more layers of coated fabric thereby creating a belt carcass, (3) continuously feeding the belt carcass into a double belt press which presses the impregnated fabric materials together with the plastisol layer(s) at a pressure of at least 5 psi to produce a preformed fabric carcass while (4) heating the preformed fabric carcass to a temperature which is within the range of 360° F. to 450° F. for a period of at least 6 minutes, and (5) continuously withdrawing the fabric carcass from the press.

20 Claims, 1 Drawing Sheet

(56) References Cited

U.S. PATENT DOCUMENTS

| | | | |
|---|---|---|---|
| 4,813,533 A | 3/1989 | Long | 198/847 |
| 4,928,812 A | 5/1990 | Van Calker et al. | 198/847 |
| 5,326,411 A * | 7/1994 | Arnold | 156/137 |
| 5,422,165 A * | 6/1995 | Arnold | 428/192 |
| 6,743,742 B1 | 6/2004 | Larocco et al. | |
| 7,776,768 B2 | 8/2010 | Hansel et al. | 442/149 |
| 7,909,719 B2 * | 3/2011 | Leighton et al. | 474/264 |
| 8,505,714 B2 * | 8/2013 | Leighton et al. | 198/847 |
| 2006/0270298 A1 | 11/2006 | Kuhn et al. | |
| 2009/0233746 A1 | 9/2009 | Leighton et al. | |

* cited by examiner

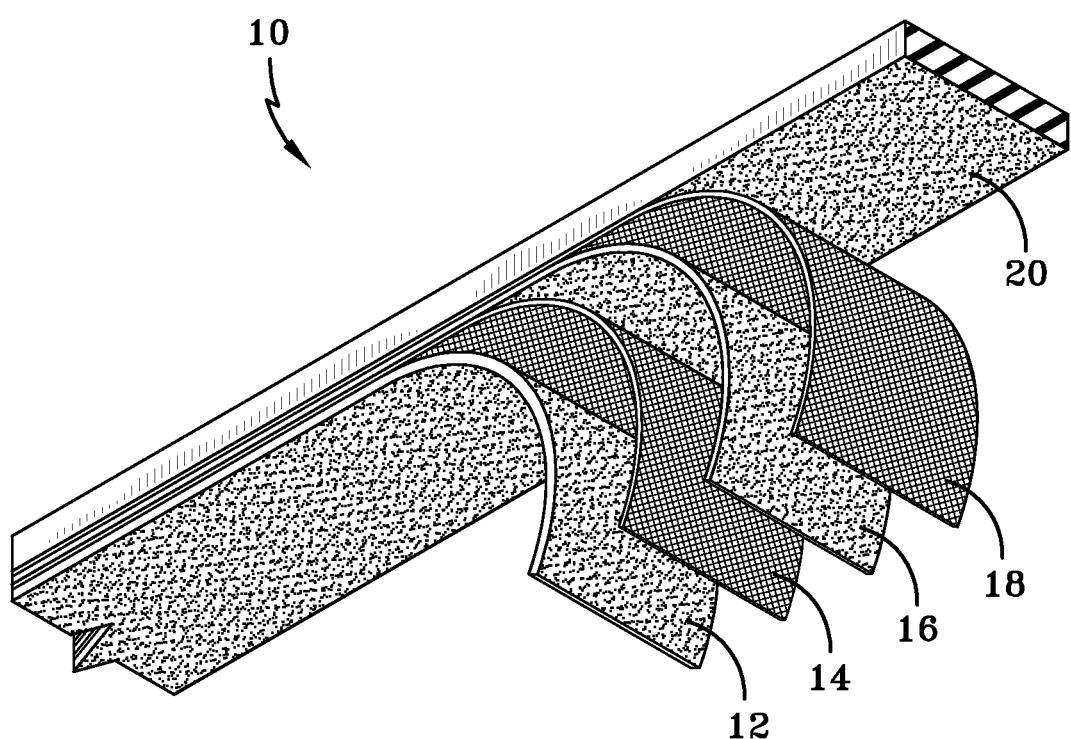

CONVEYOR BELT

This application claims the benefit of U.S. Provisional Patent Application Ser. No. 61/769,823, filed on Feb. 27, 2013. The teachings of U.S. Provisional Patent Application Ser. No. 61/769,823 are incorporated herein by reference in their entirety.

FIELD OF THE INVENTION

The invention relates to conveyor belts that are manufactured with a thermoplastic polymer and which include a fabric carcass as well as the novel method of manufacturing such belts.

BACKGROUND OF THE INVENTION

Conventional conveyor belts which are used in heavy duty applications are typically comprised of a cured rubber as a top layer, a cured rubber as a bottom layer, and a fabric reinforcement layer (a carcass) which is sandwiched between the top layer and the bottom layer. Rubber conveyor belts of this type can offer excellent performance characteristics and a relatively long service life. However, rubber conveyor belts are labor intensive to manufacture and require a curing step wherein the rubber components of the belt are cured (vulcanized) into their final form to produce the belt as a finish product.

The utilization of polyvinylchloride plastisols in adhering various components of the fabric reinforcing carcass used in conveyor belts is known in the art. For instance, U.S. Pat. No. 4,813,533 discloses a flat belting which includes a plurality of individual layers of fabric that extend throughout the length and width of the belting. The layers are joined together by reinforcing elements which extend substantially in the direction of the thickness of the belting. The individual layers and reinforcing elements are encapsulated in a matrix of polymeric elastomeric resin, for example, polyvinylchloride. The individual layers are saturated with a liquid elastomer-forming polymeric resin prior to their being joined together. The reinforcing elements may be inserted, for example, by tufting, sewing, or stitch-bonding. One or more of the individual fabric layers may be a woven or other cloth having a plurality of substantially parallel yarns which extend in the lengthwise direction of the belting. One or more of the individual fabric layers may be a non-woven fabric. In cases where the liquid saturate is a polyvinylchloride plastisol, the resin is gelled by application of heat. The term "gelling" as used in U.S. Pat. No. 4,813,533, means that the polyvinylchloride plastisol becomes solid and will not thereafter flow at room temperature but its physical properties are not yet fully developed. In any case, this reference indicates that gelling of polyvinylchloride plastisol can be accomplished by heating the liquid plastisol to temperature of at least 200° F. (93° C.) to 220° F. (104° C.).

U.S. Pat. No. 4,928,812 discloses a conveyor belt, which has a high strength, tear resistance and flame retardancy, and which is particularly suitable for use in coal mines. It comprises a matrix of thermoplastic elastomer resinous material, e.g., PVC, reinforced with an armouring comprising a layer of primary tension elements extending substantially rectilinearly in the longitudinal direction of the belt and consisting of continuous filaments, and covering layers consisting of yarns or threads disposed on both sides of the primary tension elements so as to impart coherence in the transverse direction of the belt, the top and bottom covering layers being connected by tying yarns or threads. The primary tension elements are composed of cables or cords of aramid. Adjacent primary tension elements are separated by gaps having a width of 0.5 to 3 times, more particularly 2 times the outer diameter of the primary tension elements. The gaps are filled up with one or more elements such as, e.g., cotton cables or cords. U.S. Pat. No. 4,928,812 more specifically reveals a conveyor belt comprising: (I) a matrix based on polyvinylchloride; and (II) a reinforcing construction embedded in said matrix, said reinforcing construction comprising a compound woven fabric including: (a) a first layer including (i) a plurality of primary load-bearing warp members each formed by a plurality of substantially parallel cables or cords of continuous filaments of aramid and extending rectilinearly in a longitudinal direction of the belt, each of said primary load-bearing members having an outer diameter D, adjacent ones of said primary load-bearing members being spaced apart from one another to form spaces there between having a width which is 0.5-2.0 times said outer diameter D of said primary load-bearing members and (ii) a plurality of second nonaramid cotton comprising filling warp members respectively disposed rectilinearly in said spaces between said primary load-bearing members; (b) a second layer provided on an upper side of said first layer and a third layer provided on a lower side of said first layer, said second and third layers each comprising cotton yarns adhered to said polyvinylchloride matrix; and (c) a plurality of binder warp yarns or filaments which interconnect said first layer, said second layer and said third layer.

There remains to be a long felt need for a technique of manufacturing conveyor belts which are free of rubbery polymers which require a cure cycle and that provide excellent performance characteristics and with a good service life. However, inadequate ply adhesion has been a problem that has stood in the way of such an advance in the state of the art.

SUMMARY OF THE INVENTION

The present invention provides a method for manufacturing conveyor belts which are free of rubbery polymers that need to be cured and thereby eliminates that need for curing the belts in a cure step. This technique is carried out in a continuous process that reduces labor requirements. It offers a greatly simplified alternative to extrusion coating techniques and more importantly provides belts that offer improved carcass ply adhesion which can be used in heavy duty applications. By eliminating cured rubbers from the process, recycling is a viable option by allowing for trim waste and other scrap materials to be recycled. Accordingly, by practicing the process of this invention improved belts can be made by a simpler process that requires less labor in a shorter processing time. In many cases, manufacturing cost is also reduced by reduced energy requirements and by lower cost raw materials.

The present invention more specifically discloses a method of manufacturing a fabric carcass which is of particular value in reinforcing endless belts, wherein at least two layers of fabric material are embedded in the fabric reinforcement and wherein the fabric reinforcement exhibits improved peel adhesion characteristics, said process comprising (1) impregnating a fabric material with a bonding agent in a plastisol to form coated fabric material, (2) applying a plastisol layer between two or more layers of coated fabric thereby creating a belt carcass, (3) continuously feeding the belt carcass into a double belt press which presses the-impregnated fabric materials together with the plastisol layer(s) at a pressure of at least 5 psi to produce a preformed fabric carcass while (4) heating the preformed fabric carcass to a temperature which is within the range of about 360° F. to about 450° F. for a period of at least 6 minutes, (5) continuously withdrawing the fabric carcass from the double belt press.

The subject invention also reveals a method of manufacturing a belt which comprises: (1) impregnating a fabric material with a bonding agent in a plastisol to form coated fabric material, (2) applying a plastisol layer between two or more layers of coated fabric thereby creating a belt carcass, (3) continuously feeding the belt carcass into a double belt press which presses the-impregnated fabric materials together with the plastisol layer(s) at a pressure of at least 5 psi to produce a preformed fabric carcass while (4) heating the preformed fabric carcass to a temperature which is within the range of about 360° F. to about 450° F. for a period of at least 6 minutes, (5) continuously withdrawing the fabric carcass from the double belt press, (6) scattering a thermoplastic elastomer resin composition onto the upper and lower surfaces of the fabric carcass, (7) pressing the thermoplastic elastomer resin composition onto the upper and lower surfaces of the fabric carcass by continuously feeding the fabric reinforcement into a second double belt press which is maintained at a temperature of at least 340° F. and at a pressure of at least 5 psi, and (8) continuously withdrawing the finished belt from the second double belt press.

BRIEF DESCRIPTION OF THE DRAWING

FIG. 1 is a cross sectional view of a conveyor belt which can be made by the method of this invention.

DETAILED DESCRIPTION OF THE INVENTION

In the first step of the process of this invention the fabric is continuously impregnated with a bonding agent in plastisol to form coated fabric material. The fabric utilized will typically be comprised of cotton, a polyester, a nylon, or a blend thereof. For instance, the polyester can be polyethylene terephthalate or polyethylene naphthalate. In some cases the polyester can be a copolyester which contains repeat units which are derived from both terephthalic acid and isophthalic acid or dimethyl esters thereof. In such cases the copolyester will typically contain at least about 95 weight percent terephthalic acid and up to about 5 weight percent isophthalic acid. More typically, the copolyester will contain at least about 97 weight percent terephthalic acid and up to about 3 weight percent isophthalic acid. The polyester fabric can optionally be made from polyester staple yarn to improve adhesion characteristics. The nylon fabrics that can be used in conjunction with this invention can be comprised of virtually any type of nylon, such as nylon-6,6, nylon-6,12, nylon-6,10, nylon-6,9, nylon-6, nylon-11, or nylon-12. For commercial reasons, the nylon will typically be nylon-6,6 or nylon-6. In any case, the fabric material will normally be a woven fabric.

The surfaces of the impregnated fabric are the surfaces that will come into contact with a layer(s) of a separate plastisol (without bonding agent) which will also be in contact with other layers of the fabric which makes up the fabric carcass which will ultimately be utilized as the carcass of a conveyor belt. In any case, the fabric is impregnated with a bonding agent in a plastisol in this step to produce an impregnated fabric material. It is preferred for this impregnation step to be carried out in a continuous process, such as be passing the fabric through an impregnation zone, such as a dipping bath or a coating wheel under low tension, preferably less than 6 pounds per inch of width, more preferably in the range of 1 to 5 pounds per inch of width (0.179 to 0.893 kg per cm of width). The weight ratio of the bonding agent to the plastisol will typically be within the range of 2:98 to 10:90 and will more typically be within the range of 4:96 to 8:92. The weight ratio of the bonding agent to the plastisol will most typically be within the range of 5:95 to 7:93.

The plastisols used in the practice of this invention are dispersions of polyvinylchloride homopolymer and/or vinyl acetate copolymers of vinyl chloride in conventional polyvinylchloride plasticizers. The relative amounts of the polyvinylchloride and plasticizer will be adjusted to attain a paste of the desired consistency for use in the coating application. The bonding agent employed typically contains isocyanate groups which can improve the adhesion characteristics between the fabric and the PVC. As is explained in U.S. Pat. No. 7,776,768, preference is given to use, as adhesion promoters, of isocyanurates which contain isocyanate groups and which can be prepared by oligomerization, in particular trimerization, from diisocyanates. The diisocyanates most suitable for this purpose are the mixtures, which are readily available commercially, of the isomeric diisocyanatotoluenes (TDI), composed mainly of 2,4-diisocyanatotoluene (2,4-TDI) and 2,6-diisocyanatotoluene (2,6-TDI). These can easily be reacted almost completely to give isocyanurates which contain isocyanate groups. Almost complete reaction is necessary because operator safety and product safety require that the residual content of diisocyanates in the adhesion promoter preparation remains below 1.0% by weight. Diisocyanatodiphenylmethanes (MDI) are likewise readily available but are less suitable, and are more difficult than TDI to trimerize and can therefore lead to undesirably high residual content of diisocyanates. Isocyanurates which contain isocyanate groups based on MDI moreover exhibit poor solubility and have a tendency towards crystallization.

Isocyanurates which contain isocyanate groups are particularly easy to handle as adhesion promoters when they are used in the form of a solution in a plasticizer. In a practical method, the isocyanurates which contain isocyanate groups and are derived from TDI are likewise prepared in the plasticizer used as solvent. DE 24 19 016 A1 (GB 145 570 1A) describes by way of example these adhesion promoters and adhesion promoter preparations comprising plasticizer, and their preparation and their use.

Plasticizers are substances which on mixing with PVC, which is intrinsically hard and brittle, give a soft, tough material known as plasticized PVC. Examples of known plasticizers are the esters of phthalic acid, adipic acid or benzoic acid. Plasticized PVC can comprise large amounts of these plasticizers, sometimes more than 50% by weight of the plasticized PVC.

In the second step of the process, at least one layer of plastisol without bonding agent is applied between two of the impregnated fabric layers. This process is repeated depending on the number of impregnated fabric layers. The plastisol may be the same or different than the plastisol used to impregnate the fabric. Once the plastisol layer is applied, it is pregelled by heating it to a temperature between 100° F. (37.8° C.) and 200° F. (93.3° C.), more preferably between 150° F. (65.5° C.) and 180° F. (82.2° C.). This process is completed with minimum tension on the fabric layers, preferably less than 6 pounds per inch of width (1.071 kg per cm of width), and more preferably at a tension of 1 to 5 pounds per inch of width (0.179 to 0.893 kg per cm of width). The result of this step is a pregelled fabric carcass.

In the third step of the process the pregelled fabric carcass is continuously fed into a double belt press wherein it is pressed together at a pressure of at least 5 psi ($3.5 \times 10^4$ pascals). The belts of the belt press will typically have surfaces which are comprised of polytetrafluoroethylene (PTFE)

impregnated fiber glass or a thin layer of stainless steel. The belt press will typically apply a pressure of 5 psi to 35 psi ($3.5\times10^4$ pascals to $2.4\times10^5$ pascals), more typically 10 psi to 30 psi, will preferably apply a pressure of 12 psi to 25 psi ($8.3\times10^4$ pascals to $1.7\times10^5$ pascals), and will most preferably be 15 psi to 20 psi ($1.0\times10^5$ pascals to $1.4\times10^5$ pascals).

The fabric carcass will be maintained in the double belt press at a temperature which is within the range of about 360° F. (182° C.) to about 450° F. (232° C.) for a period of at least 6 minutes. The temperature will preferably be maintained within the range of about 375° F. (191° C.) to about 425° F. (218° C.) and will most preferable be maintained within the range of 390° F. (199° C.) to 410° F. (210° C.). The fabric carcass will typically have a residence time in the double belt press which is within the range of 8 minutes to 14 minutes and will most preferably have a residence time in the double belt press which is within the range of 9 minutes to 12 minutes.

After being maintained in the double belt press for the desired residence time the fabric carcass is continuously removed from the press as a finished fabric carcass which is suitable for use as the carcass of a conveyor belt. In one embodiment of this invention such a conveyor belt is made continuously with the finished fabric carcass as it is being withdrawn from the double belt press. In such a process a thermoplastic elastomer resin composition is continuously scattered onto the upper and lower surfaces of the fabric carcass. The thermoplastic elastomer resin is in the form of particles which typically have a size distribution of between 0.25 mm and 1 mm with an average of 0.5 mm. The thermoplastic elastomer resin is typically plasticized PVC. However, the thermoplastic elastomer resin can also be a polyurethane resin or a polyolefin, such as polyethylene or polypropylene. The thermoplastic material is then pressed onto the upper and lower surfaces of the fabric reinforcement by continuously feeding the fabric reinforcement into a second double belt press which is maintained at a temperature of at least 340° F. (171° C.). The thermoplastic material can optionally include fillers, such as calcium carbonate, coloring agents, such as carbon black or titanium dioxide, flame retarding agents, antimicrobial agents, antistatic agent and/or antifungal agents. In the case of PVC it is frequently desirable to further include chlorinated polyethylene or a nitrile rubber.

Conveyor belts made utilizing fabric reinforcement which is manufactured utilizing the method of this invention typically include an elastomeric body having a load carrying surface and a parallel pulley engaging surface wherein the fabric reinforcement is disposed within the elastomeric body of the belt. Such a conveyor belt 10 is depicted in FIG. 1 wherein the fabric reinforcement is comprised of a first fabric layer 14, a plastisol layer 16, and a second fabric layer 18. This fabric reinforcement is situated between the pulley cover layer 12 and the load carrying layer 20 of the belt 10.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

In this experiment a fabric carcass which was suitable for reinforcing conveyor belts was prepared. In the first step of the procedure, a bond plastisol composition was made by mixing 200 grams of emulsion grade polyvinylchloride (PVC) into a liquid plasticizer solution containing 86 grams of diisononylphthalate (DINP), 6 grams of epoxidized soybean oil (ESO), and 6 grams of calcium/zinc stabilizer (Mark 3079).

Subsequently, 1.2 grams of Lanxess bonding agent 2001N (containing 40 weight percent 2,4-toluene diisocyanate/2,6-toluene diisocyanate mixture (TDI) in dibutyl phthalate) was mixed into 20 grams of the bond plastisol composition which was previously made. Then, this composition was evenly applied to both sides of two 6.5 inch by 6.5 inch (16.5 cm by 16.5 cm) squares of a polyester fabric (35.5 ends per inch of 2000 denier polyester yarn in the warp direction and 10.5 picks per inch (4.1 picks per cm) of 4000 denier polyester yarn in the weft direction).

Then, a ply plastisol composition was made by 100 grams of emulsion grade polyvinylchloride (PVC) into a solution of 68.18 grams of diisononylphthalate (DINP), 30.77 grams of calcium carbonate (4 micron particle size), 2.93 grams of epoxidized soybean oil (ESO), 1.91 grams of calcium/zinc stabilizer (Mark 3079), and 0.21 grams of stearic acid. Then, this ply plastisol composition was applied evenly to one side of one of the fabric squares which were previously coated with the plastisol containing bonding agent. Subsequently, the ply plastisol coated fabric was laid on top of the fabric square which had been coated with only the bond plastisol composition so as to bring the bond plastisol coated surface into contact with the ply plastisol coated surface. This resulted in the formation of a carcass of the fabric material The fabric carcass was then placed in a heated press at held at a temperature of 360° F. (182° C.) for 10 minutes under the effective surface pressure of 23.7 pounds per square inch ($1.6\times10^5$ pascals) which required 1000 pounds of pressure over the 42.25 square inches (272.6 square centimeters) of fabric. The carcass was then cut into strips which were 1 inch (2.54 centimeters) wide and 6 inches (15.24 centimeters) long. The two fabric surfaces were pulled apart in accordance with the ASTM 751 test method to measure peel adhesion using an Instron mechanical tester. The average adhesion of 3 pulls was reported as 49.3 lbf/1 inch width (437 N/5 cm) as pulled in the warp direction.

The fabric carcass can then be used in building a short span of experimental conveyor belt. In such a process, pellets of the PVC based thermoplastic elastomer would be poured onto a 12 inch by 12 inch sample of PTFE impregnated fiberglass sheet. The carcass would be laid on top of the pellets and then covered with a second PTFE impregnated fiberglass sheet. This construction is placed in the heated press at 400° F. (200° C.) at 23.6 psi ($1.6\times10^5$ pascals) for 5 minutes. The construction is removed from the press and the top sheet removed. A second layer of the PVC based thermoplastic elastomer pellets is spread over the hot construction, covered with the PTFE impregnated fiberglass sheet, and placed back in the heated press. The sample is heated at 400° F. (200° C.) at 23.6 psi ($1.6\times10^5$ pascals) for 2.5 minutes. A belt sample can thus be prepared for analysis.

Comparative Example 2

A carcass construction was prepared utilizing the same procedure as in Example 1 except that it was placed in a forced air oven between two aluminum plates at 360° F. (182° C.) for 10 minutes. In this experiment the effective pressure on the carcass fabric was only 0.04 pounds per square inch (276 pascals) which represented 2.6 pounds (1.18 kg) over the 64 square inches (413 cm$^2$) of fabric. The average peel adhesion for this construction made by this procedure was determined to be only 36.2 lbf/1 inch (322 N/5 cm) width in the warp direction. This example demonstrates the importance of pressure in the claim.

Example 3

In this experiment another carcass construction was made for comparative purposes. The procedure used a bond plastisol which was made by 2600 lbs (1180 kg) of emulsion grade polyvinylchloride (PVC) to a vessel containing 1119 lbs (508 kg) of diisononylphthalate (DINP), 77.8 lbs (35.3 kg) of epoxidized soybean oil (ESO), and 77.9 lbs (35.3 kg) of calcium/zinc stabilizer (Mark 3079). Then, 2.2 pounds (1.0 kg) of 6% by weight Lanxess Bonding Agent 2001N (40 weight percent 2,4-toluene diisocyanate/2,6-toluene diisocyanate mixture (TDI) in dibutyl phthalate) was added to 35 pounds (15.9 kg) of the bond plastisol previously made just before adding it to a charge tank. This step was repeated as the mixture was used in the process. The bond paste was then pumped to a dip tank in which a polyester fabric was continuously fed to the dip tank where it is immersed and then scraped to remove excess plastisol. The tension on this fabric was less than 6 pounds per inch of width (1.071 kg per cm of width) of fabric.

The polyester fabric was woven using 29.8 ends per inch (11.7 ends per cm) of 3000 denier polyester yarn in the warp direction and 10.0 picks per inch (3.93 picks per cm) of 4000 denier polyester yarn in the weft direction. This fabric was heat set in water prior to use. Two plys of the fabric were dipped in the bond paste containing bonding agent and then were heated to a temperature which was within the range of 160° F. (71° C.) to 180° F. (82° C.) to pre-gel the plastisol.

A ply plastisol was made by mixing 1950 lbs (884.5 kg) of emulsion grade polyvinylchloride (PVC), 600 lbs (272 kg) of calcium carbonate (4 micron particle size) and 4.0 lbs (1.8 kg) of stearic acid into 1329.8 pounds (603.2 kg) of diisononylphthalate (DINP), 57.2 pounds (25.9 kg) of epoxidized soybean oil (ESO), 37.3 pounds (16.9 kg) of calcium/zinc stabilizer (Mark 3079). This ply plastisol composition was applied to the bottom ply and heated to 190° F. (88° C.) to pre-gel before the two plys were brought together between three heated steel rolls. The pregelled carcass was preheated to 320° F. (160° C.) just prior to entering the fusing oven. The residence time in the fusing oven was 11.8 minutes with the temperature being maintained at 400° F. (204° C.). The pressure on the carcass was not measured.

A sample of the carcass was cut into 1 inch wide by 6 inch long (2.54 cm by 15.2 cm) strips. The two fabric surfaces were pulled apart in accordance with ASTM 751 test method to measure peel adhesion using an Instron mechanical tester. The average adhesion was reported as 42.5 lbf/1 inch (378 N/5 cm) width as pulled in the warp direction. Accordingly, excellent peel adhesion was attained using this procedure.

Example 4

In this experiment a complete conveyor belt was built utilizing the principals of this invention. The procedure used a bond plastisol which was made by mixing 2600 lbs (1180 kg) of emulsion grade polyvinylchloride (PVC) to a vessel containing 1119 lbs (508 kg) of diisononylphthalate (DINP), 77.8 lbs (35.3 kg) of epoxidized soybean oil (ESO), and 77.9 lbs (35.3 kg) of calcium/zinc stabilizer (Mark 3079). Then, 2.2 pounds (1.0 kg) of 6% by weight Lanxess Bonding Agent 2001N (40 weight percent 2,4-toluene diisocyanate/2,6-toluene diisocyanate mixture (TDI) in dibutyl phthalate) was added to 35 pounds (15.9 kg) of the bond plastisol previously made just before adding it to a charge tank. This step was repeated as the mixture was used in the process. The bond paste was continuously applied to the surface of a polyester fabric. The excess plastisol was removed by a roller. The polyester fabric was woven using 35.5 ends per inch (14.0 ends per cm) of 2000 denier polyester yarn in the warp direction and 10.5 picks per inch (4.13 picks per cm) of 4000 denier polyester yarn in the weft direction. This fabric was heat set in water prior to use. Two plys of the fabric were dipped in the bond paste containing bonding agent and then then heated to 160° F. (71° C.) to 180° F. (82° C.) to pre-gel the plastisol.

Then a ply plastisol was made by mixing 1950 lbs (884.5 kg) of emulsion grade polyvinylchloride (PVC), 600 lbs (272 kg) of calcium carbonate (4 micron particle size) and 4.0 lbs (1.8 kg) of stearic acid into 1329.8 pounds (603.2 kg) of diisononylphthalate (DINP), 57.2 pounds (25.9 kg) of epoxidized soybean oil (ESO), 37.3 pounds (16.9 kg) of calcium/zinc stabilizer (Mark 3079). It was subsequently applied to the bottom ply of fabric and heated to 190° F. (88° C.) to pre-gel before the two plys were brought together between four heated steel rolls. The pregelled carcass was next fed between the four heated rolls to heat it to a surface temperature of 365° F. (185° C.). The residence time on the heated rolls was 6 minutes.

A sample of the carcass was cut into 1 inch wide by 6 inch long (2.54 cm by 15.2 cm) strips. The two fabric surfaces were pulled apart in accordance with the ASTM 751 test method to measure peel adhesion using an Instron mechanical tester. The average adhesion was reported as 24.0 lbf/1 inch (213.5 N/5 cm) width as pulled in the warp direction. The desired ply adhesion was not achieved because the parameters established in this invention were not achieved.

A coating which was comprised of a blend of plasticized polyvinylchloride and chlorinated polyethylene in the form of thermoplastic elastomer (TPE) pellets was applied to a belt made of PTFE impregnated fiberglass. These TPE pellets had an average particle size of approximately 0.5 mm. The carcass created above was laid on top of the pellets. A second layer of TPE pellets was applied on the carcass. This construction was fed between two of the PTFE impregnated belts and fed through an oven at 420° F. (216° C.) under a pressure of less than 30 psi ($2.1 \times 10^5$ pascals). The residence time in the oven was 9 minutes.

While certain representative embodiments and details have been shown for the purpose of illustrating the subject invention, it will be apparent to those skilled in this art that various changes and modifications can be made therein without departing from the scope of the subject invention.

What is claimed is:

1. A method of manufacturing a fabric reinforcement which is of particular value in reinforcing endless belts, wherein at least two layers of fabric material are embedded in the fabric reinforcement and wherein the fabric reinforcement exhibits improved peel adhesion characteristics, said process comprising (1) impregnating a fabric material with a bonding agent in a plastisol to form coated fabric material, (2) applying a plastisol layer between two or more layers of coated fabric thereby creating a belt carcass, (3) continuously feeding the belt carcass into a double belt press which presses the impregnated fabric materials together with the plastisol layer(s) at a pressure of at least 5 psi to produce a preformed fabric carcass while (4) heating the preformed fabric carcass to a temperature which is within the range of about 360° F. to about 450° F. for a period of at least 6 minutes, (5) continuously withdrawing the fabric carcass from the double belt press.

2. A method of manufacturing a belt which comprises: (1) impregnating a fabric material with a bonding agent in a plastisol to form coated fabric material, (2) applying a plastisol layer between two or more layers of coated fabric thereby creating a belt carcass, (3) continuously feeding the belt carcass into a double belt press which presses the impregnated fabric materials together with the plastisol layer(s) at a pressure of at least 5 psi to produce a preformed fabric carcass while (4) heating the preformed fabric carcass to a temperature which is within the range of about 360° F. to about 450° F. for a period of at least 6 minutes, (5) continuously withdrawing the fabric carcass from the double belt press, (6) scattering a thermoplastic elastomer resin composition onto the upper and lower surfaces of the fabric carcass, (7) pressing the thermoplastic elastomer resin composition onto the upper and lower surfaces of the fabric carcass by continuously feeding the fabric reinforcement into a second double belt press which is maintained at a temperature of at least 340° F. and at a pressure of at least 5 psi, and (8) continuously withdrawing the finished belt from the second double belt press.

3. The belt made by the process specified in claim 2.

4. The method of claim 2 wherein the fabric material is a polyester fabric.

5. The method of claim 2 wherein the fabric material is a nylon fabric.

6. The method of claim 4 wherein the polyester fabric is comprised of polyethylene naphthalate.

7. The method of claim 2 wherein the bonding agent is comprised of about 20 weight percent to about 60 weight percent toluene diisocyanate and about 40 weight percent to about 80 weight percent of a plasticizer.

8. The method of claim 2 wherein the inside surfaces of a fabric material are sequentially coated with a mixture of a plastisol and a bonding agent, and then a plastisol to form coated fabric material.

9. The method of claim 2 wherein the weight ratio of the bonding agent to the plastisol is within the range of 2:98 to about 10:90.

10. The method of claim 2 wherein the coated fabric materials in the double belt press are pressed together at a pressure within the range of 14 psi to 30 psi to produce a preformed fabric reinforcement.

11. The method of claim 10 wherein the preformed fabric reinforcement is maintained in the double belt press at a temperature which is within the range of about 380° F. to about 425° F. for a period of at least 8 minutes.

12. The method of claim 2 wherein the thermoplastic elastomer resin composition is a polyvinylchloride composition comprised of polyvinylchloride and a plasticizer.

13. The method of claim 2 wherein the double belt press belt has belt surfaces which are comprised of stainless steel.

14. The method of claim 13 wherein the polyvinylchloride resin composition is further comprised of at least one filler.

15. The method of claim 14 wherein the polyvinylchloride resin composition is further comprised of chlorinated polyethylene.

16. The method of claim 14 wherein the polyvinylchloride resin composition is further comprised of antistatic agent.

17. The method of claim 2 wherein the double belt press belt has belt surfaces which are comprised of polytetrafluoroethylene impregnated fiber glass.

18. The method of claim 2 wherein the double belt press heats the preformed fabric reinforcement by conduction heating.

19. The method of claim 2 wherein the thermoplastic elastomer resin composition is a polyurethane composition.

20. The method of claim 2 wherein the thermoplastic elastomer resin composition is polypropylene.

* * * * *